United States Patent [19]

Barnes et al.

[11] 4,348,652
[45] Sep. 7, 1982

[54] DRIVER ALERT SYSTEM

[75] Inventors: Robert R. Barnes, 1542 SW. Glick Rd., Topeka, Kans. 66604; Charles L. Myers, Lexington, N.C.

[73] Assignee: Robert R. Barnes, Emporia, Kans.

[21] Appl. No.: 191,697

[22] Filed: Sep. 29, 1980

[51] Int. Cl.³ .................... G05B 1/00; G08B 21/00
[52] U.S. Cl. ................... 340/52 R; 250/222 R; 250/561; 340/32
[58] Field of Search .............. 340/32, 38 P, 52 R; 250/340, 341, 560, 561, 215, 221, 222 R; 180/167, 168, 169

[56] References Cited

U.S. PATENT DOCUMENTS

| | | | |
|---|---|---|---|
| 2,074,251 | 3/1937 | Braun | 340/52 R |
| 2,331,144 | 10/1943 | Sitter | 340/52 R |
| 3,201,750 | 8/1965 | Morin | 340/52 |
| 3,708,668 | 1/1973 | Tilley | 180/169 X |
| 3,739,179 | 6/1973 | Krekow | 250/216 |
| 3,811,046 | 5/1974 | Levick | 250/206 |
| 3,881,568 | 5/1975 | Ando et al. | 180/168 |
| 4,003,445 | 1/1977 | DeBruine | 180/98 |
| 4,143,264 | 3/1979 | Gilbert et al. | 250/210 |

Primary Examiner—John W. Caldwell, Sr.
Assistant Examiner—Joseph E. Nowicki
Attorney, Agent, or Firm—D. A. N. Chase; Michael Yakimo, Jr.

[57] ABSTRACT

A highway line detection system which is insensitive to changes in road surface warns the driver of a motor vehicle when the vehicle is about to drift across either a center line or an edge line. A unit on each side of the vehicle directs light rays rich in infrared and red radiation downwardly toward the road surface, and includes a photoresponsive receiver responsive to the rays reflected from a painted line or mark. A valid center line or edge line has a width within a predetermined range of minimum and maximum widths and is recognized by the receiver to activate a suitable alarm, but other markings of greater or lesser width are discriminated against to prevent a false alarm. The receiver employs a series of photoconductive cells which are highly sensitive to radiation in the red and near infrared region; they are spaced horizontally on a line extending orthogonally with respect to the fore-and-aft axis of the vehicle in order to establish corresponding spaced points at which reflected rays are detected. Logic circuitry responsive to the photocell outputs activates the alarm if the combination of responding photocells is indicative of the reflection of received rays from a line on the road surface of at least said minimum width but no greater than said maximum width.

15 Claims, 6 Drawing Figures

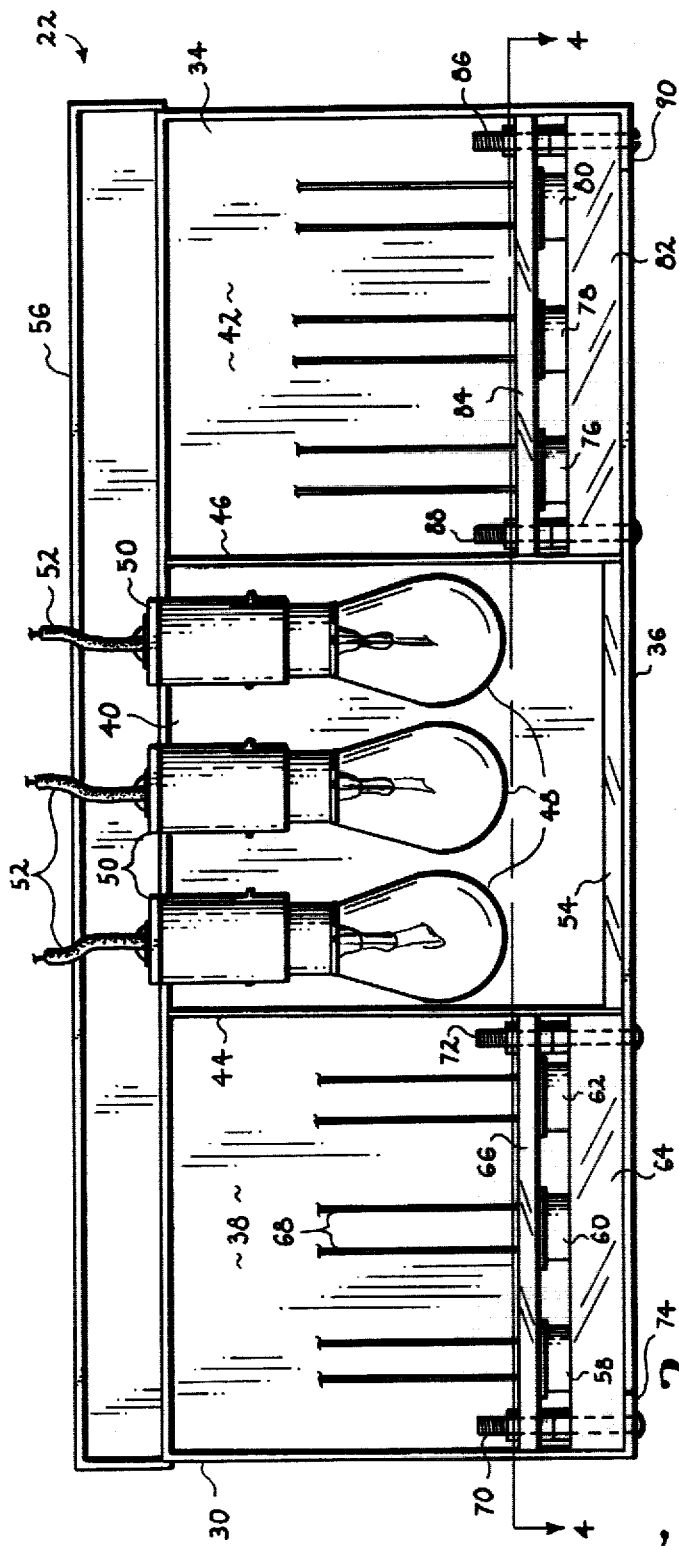
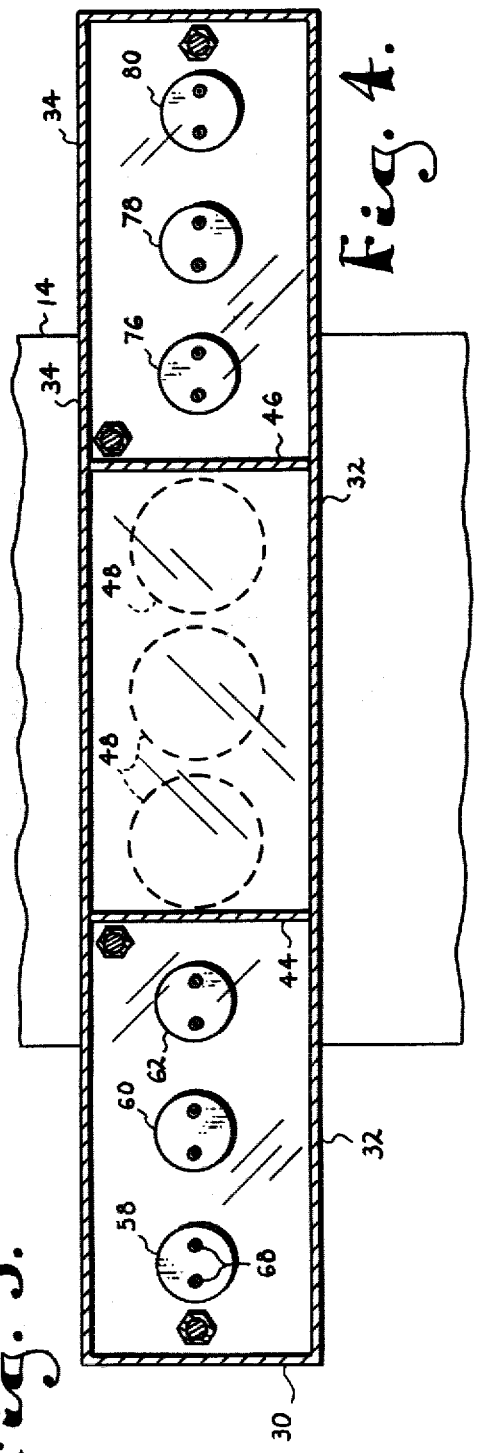

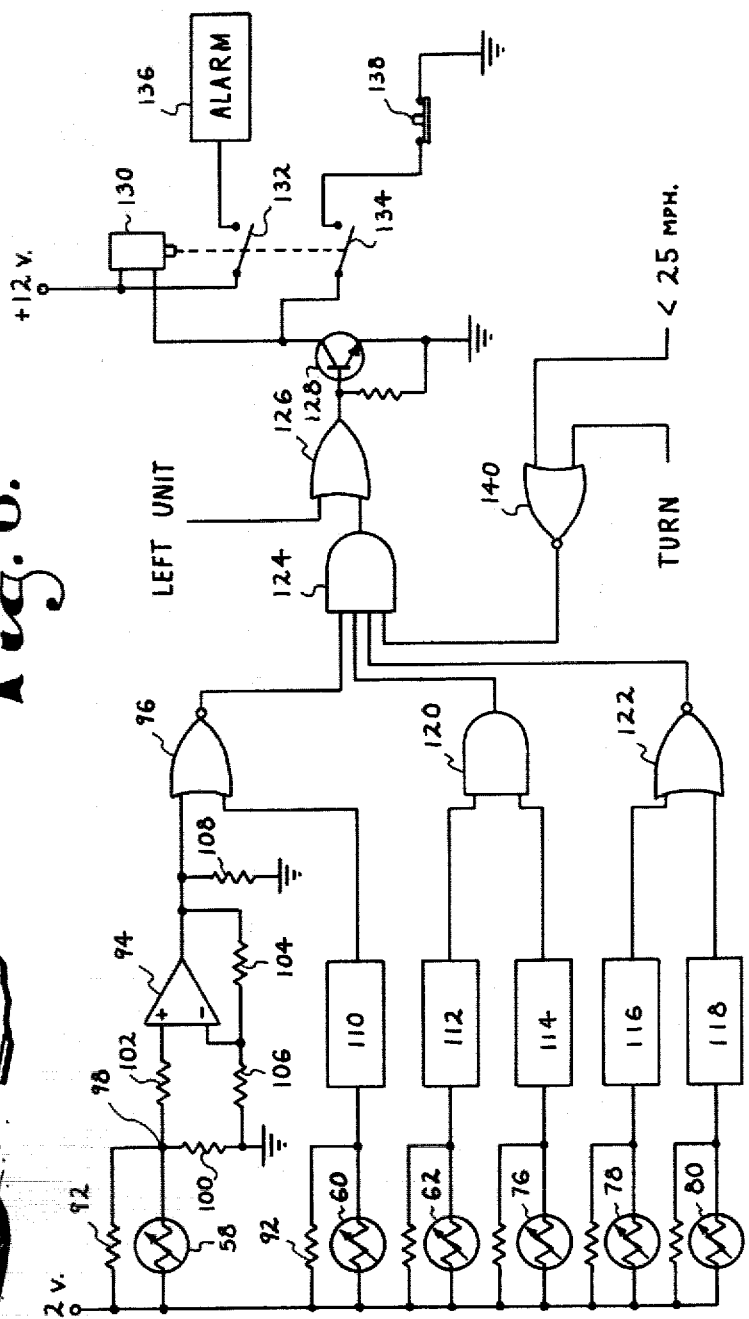
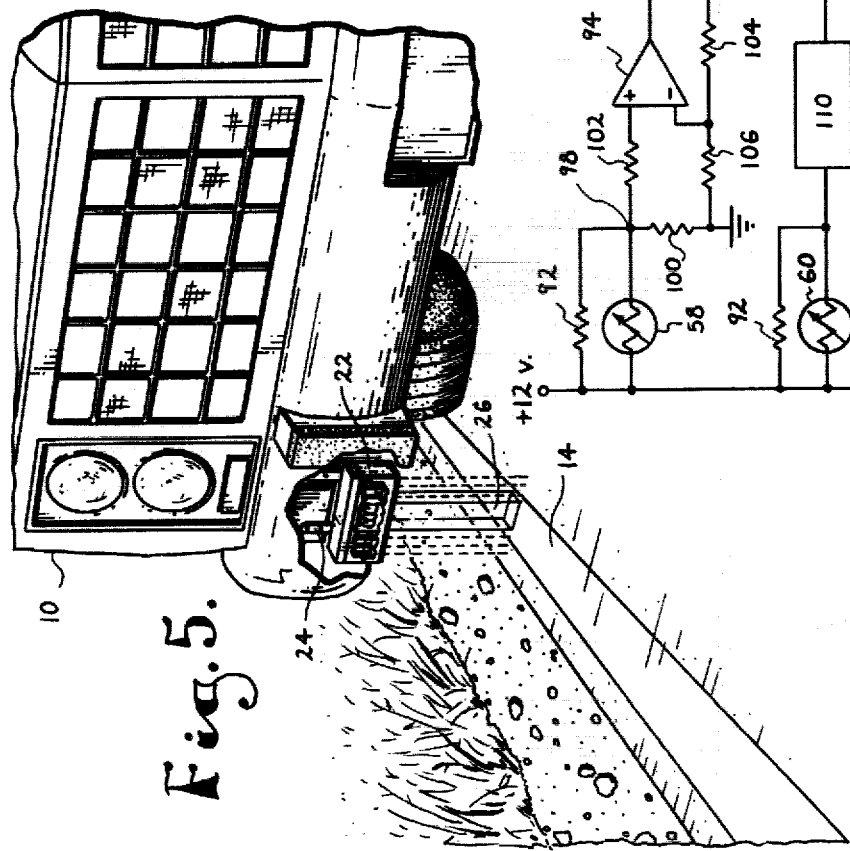
Fig. 5.
Fig. 6.

DRIVER ALERT SYSTEM

This invention relates to improvements in highway line detection systems for warning the driver of a motor vehicle when the vehicle is about to drift across either a center line or an edge line and, in particular, to such a system which discriminates against other marks on the road surface and is insensitive to changes in the light reflecting characteristics of the surface.

A significant number of nighttime highway accidents occur because the driver of a motor vehicle becomes drowsy or inattentive or goes to sleep. Although alert systems have been proposed which respond to the highway lines that delineate the lanes, such systems are apparently not in widespread use. Two problems are encountered which a practical and acceptable system must overcome, as will be discussed.

First, it is requisite that such an alert system be insensitive to the other painted markings on highways, such as radar markings, crosswalks, test lines (used to test paint), wide stripes used to mark on and off ramps, and special markings observed from aircraft for speed checking. The system must respond exclusively to either the center line of the highway or the edge line, each of which are characterized by relatively narrow and uniform widths throughout the United States of America. On the average, these lines are approximately 4½ inches wide but may vary from 4 to 5 inches in width.

Secondly, the reflectivity of road surfaces varies widely. In particular, a concrete road surface is relatively highly reflective as compared wih an asphalt surface. Asphalt surfaces, of course, vary considerably from a gray color to essentially black. This extreme variation in background seen by a photosensor creates a special problem in the design of a detection system which will respond exclusively to light reflected from a painted line to the exclusion of reflections of lesser intensity from the surrounding road surfaces.

It is, therefore, an important object of the present invention to provide a driver alert system having a photodetector which is responsive to light rays reflected from a center line or edge line of a road surface but discriminates against other markings to prevent a false alarm.

As a corollary to the foregoing object, it is an important aim of this invention to provide such a system that recognizes valid lines by establishing a predetermined range of minimum and maximum line widths which will be considered valid, in order to discriminate against other markings of greater or lesser width.

It is another important object of the present invention to provide a driver alert system having photoresponsive means which is insensitive to changes in the reflective characteristics of the road surface, and to accomplish this objective without adjusting the response of the system or providing compensation circuitry in the electronics of the system.

In furtherance of the immediately preceding object, it is an important aim of this invention to provide a means of rendering the background road surface relatively constant in its reflective characteristics through the employment of a photodetection system that utilizes radiant energy in the infrared and red spectrum.

Other objects and advantages include the provision of such a system which differentiates between slow drifting of the vehicle and sudden veering such as an avoidance maneuver, which is automatically disabled when the speed of the vehicle drops below a predetermined minimum speed, and which is also disabled whenever the driver operates the turn signals.

DESCRIPTION OF THE DRAWINGS

FIG. 3 is a view of the detector unit with the front panel thereof removed, showing the interior construction in elevation;

FIG. 4 is a horizontal sectional view taken along line 4—4 of FIG. 3, with an edge line on the roadway illustrated therebeneath;

FIG. 5 is a fragmentary, perspective view similar to FIG. 1 but showing the vehicle as it begins to drift across the edge line; and FIG. 6 is an electric schematic and logic diagram of the system.

DETAILED DESCRIPTION

Figures 1, 2:
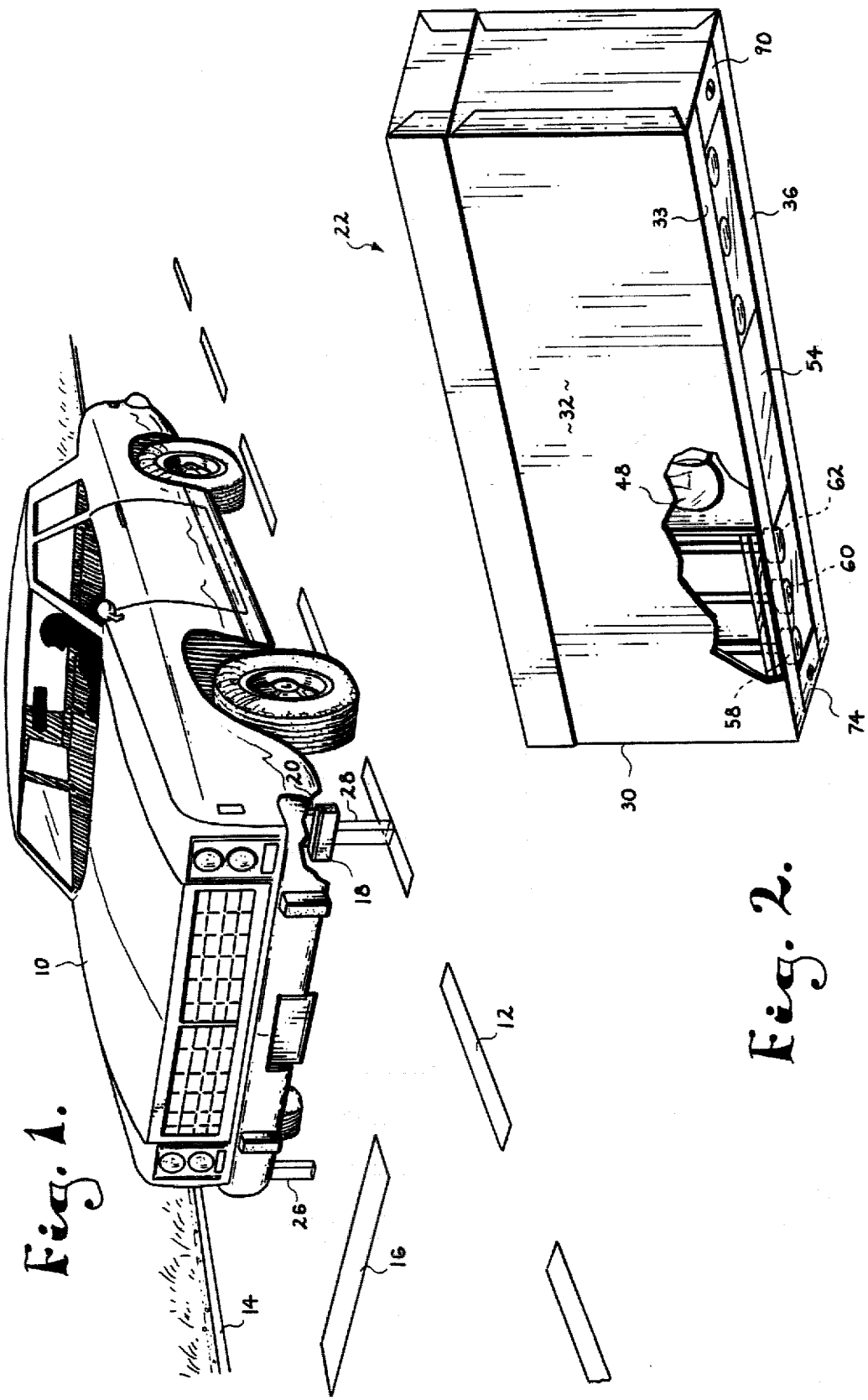
FIG. 1 is a front perspective view showing a vehicle equipped with the system of the present invention and illustrates the vehicle as it begins to drift across the center line of the highway.
FIG. 2 is a frontal perspective view of one of the detector units of the present invention, a portion of the housing being broken away to reveal details of construction.

Referring to FIG. 1, an automobile 10 is shown on a highway having a broken center line 12 and a continuous edge line 14 defining the shoulder thereof. For purposes of illustration, the lane of the highway seen in FIG. 1 also has painted thereon a radar marking 16 of the usual type in the form of a transversely extending stripe located approximately in the middle of the lane. The automobile 10 is equipped with the system of the present invention, the left end of the front bumper being broken away to reveal one of the detector units 18 secured to the bumper or frame by a suitable bracket 20. In FIG. 5 it may be seen that an identical detector unit 22 is mounted on the vehicle at the right side thereof behind the right end of the front bumper by a bracket 24.

A rectangular shaft of light 26 is shown in FIG. 5 extending vertically downwardly from the unit 22 to the edge line 14. The automobile 10 is shown as it begins to drift across the edge line 14, exactly at the time when the shaft of light 26 is directly aligned with the edge line 14. Three broken lines on each side of the shaft of light 26 are for the purpose of illustrating the relative positions of each of the photocells of the unit, and their respective lateral spacings, to be hereinafter described. Similarly, in FIG. 1 a shaft of light 28 is shown directed vertically downwardly and directly aligned with the center line 12.

The right detector unit 22 is shown in detail in FIGS. 2, 3 and 4. A rectangular housing 30 has a front panel 32 which is broken away in FIG. 2 and is removed in FIG. 3. As is clear in FIG. 2, the bottom of panel 32 is provided with an inwardly extending flange 33; similarly, the housing 30 has a rear panel 34 provided with an inwardly extending bottom flange 36. The opposed bottom flanges 33 and 36 define an opening therebetween extending longitudinally of the housing 30 and orthogonally with respect to the fore-and-aft axis of the automobile 10. Accordingly, as may be seen in FIG. 4, a vehicle traveling straight down the highway (in a direction parallel to the center line 12 and edge line 14) causes the elongated housing 30 to be disposed in perpendicular relationship to the center line 12 and edge line 14.

The housing 30 is divided into three compartments 38, 40 and 42 by vertical partitions 44 and 46. The center compartment 40 houses three incandescent lamps 48 arranged in a row longitudinally of the housing 30. Sockets 50 mount the lamps 48 in the compartment 40 and depend from opposed top flanges of the panels 32 and 34. A lead 52 extends from each of the sockets 50 for the purpose of connecting the lamps 48 in parallel to a suitable power source, typically the 12 volt DC source provided by the vehicle. The ground return is through the housing 30 since it is secured to the vehicle frame. The surfaces of the interior walls defining the compartment 40 are preferably painted white to reflect the light produced by the lamps 48. A clear, transparent lens 54 overlies the bottom flanges 33 and 36 and closes the bottom of the compartment 40. The housing 30 is closed at its top by a cover 56.

Each of the end compartments 38 and 42 is identical and houses three photoconductive cadmium selenide cells. Referring to compartment 38, photocells 58, 60 and 62 therein are equally spaced in a row extending longitudinally of the housing 30 as is clear in FIG. 4. The photocells 58, 60 and 62 are sandwiched between a red lens 64 and a plate 66 of insulating material, a pair of leads 68 extending upwardly from each photocell through apertures in plate 66 for connection with logic circuitry to be described. Two nut and bolt assemblies 70 and 72 secure the components in place with the lens 64 overlying the bottom flanges 33 and 36 and a bottom flange 74 on the adjacent end wall. The lens 64 serves as an optical filter to pass radiant energy in the infrared and red spectrum and attenuate shorter wave lengths, and spans the walls of the compartment 38 to close the same at the bottom.

The other end compartment 42 contains three photocells 76, 78 and 80, a red lens 82, an insulating plate 84, and nut and bolt assemblies 86 and 88 securing the components to flange 36 and a bottom flange 90 on the adjacent end wall, all of which are arranged in identically the same manner as in compartment 38.

Referring to FIG. 6, one lead from each of the photocells is connected to +12 volts, derived from the vehicle power source. The negative side of the DC source is represented in the circuitry by the ground symbols. Each photocell is connected in parallel with an equalizing resistor 92, typically 10 megohms. The circuitry associated with photocell 58 is shown in detail and includes an operational amplifier 94 which has its output connected to one input of a two-input NOR gate 96. The side of photocell 58 not connected to the +12 volt supply presents a junction point 98 from which a resistor 100 extends to ground. A resistor 102 is connected from junction point 98 to the noninverting input of operational amplifier 94. A feedback resistor 104 is connected from the output of amplifier 94 to the inverting input thereof, and a resistor 106 is connected from the inverting input to ground. A pull-down resistor 108 is connected from the output of operational amplifier 94 to ground. Representative values for the resistors are as follows:

Resistor 100: 1 megohm
Resistor 102: 10,000 ohms
Resistor 104: 50,000 ohms
Resistor 106: 10,000 ohms
Resistor 108: 220 ohms In the absence of light impinging thereon, the resistance of photocell 58 is on the order of 20 to several hundred megohms and decreases to several thousand ohms in the presence of bright light. When this occurs, the output of operational amplifier 94 goes from zero to a significantly positive voltage, such as 5 volts, thereby applying a positive logic level to the corresponding input of NOR gate 96.

Each of the other photocells 60, 62, 76, 78 and 80 has the same characteristics and drives operational amplifier circuitry identical to that just described. Accordingly, for simplicity of illustration, each such circuit is illustrated by a block 110, 112, 114, 116 and 118 corresponding to photocells 60, 62, 76, 78 and 80 respectively. The output from circuit 110 is connected to the other input of NOR gate 96. The outputs of circuits 112 and 114 are connected to respective inputs of an AND gate 120. The outputs of circuits 116 and 118 are connected to respective inputs of a NOR gate 122. The outputs of the gates 96, 120 and 122 are connected to respective inputs of a four-input AND gate 124, the output thereof being connected to one input of a two-input OR gate 126. The other input of the OR gate 126 is connected to identical logic circuitry associated with the left detector unit 18.

The output of OR gate 126 is connected to the base of an NPN transistor switch 128 which serves as a driver for an electromechanical relay having a coil 130, upper contacts 132, and lower contacts 134. Both sets of contacts are normally open as illustrated. Closure of contacts 132 activates a suitable alarm 136 such as a warning buzzer that is clearly audible to the driver of the vehicle. The lower contacts 134 provide a latching circuit for the relay, such circuit being broken by a normally closed, push button reset switch 138. The reset switch 138 would be mounted on the dashboard or near the dashboard where it is accessible to the driver. The circuitry may be turned off and on at the option of the driver by a separate switch (not shown) located at an accessible position on or near the dashboard.

The fourth input of AND gate 124 provides a disable function in the event that either one of two conditions occurs. Such input is connected to the output of a NOR gate 140 having two inputs controlled by the turn signals and the speed of the vehicle respectively. As indicated in FIG. 6 by the logic command TURN, operation of the turn signals places the high logic level on this input. Similarly, if the speed of the vehicle is below a predetermined minimum speed, such as 25 miles per hour, the high logic level is impressed on the other input. In either case, the output of NOR gate 140 goes low to cause the output of AND gate 124 to remain at the low logic level irrespective of the condition on its other inputs. A high logic level output from AND gate 124 constitutes an activating signal which causes the energization of relay coil 130 and operation of the alarm 136.

OPERATION

Referring to FIG. 4, the inner pair of photocells 62 and 76 are spaced apart a distance which establishes a response window of minimum width, i.e., a window that will be spanned by light rays reflected from the line 14 when the line has a minimum predetermined width indicative of a valid center line or edge line, and when the detector unit is centered over the line as illustrated in FIG. 4 with respect to the line 14. The width of the line 14 in FIG. 4 is of approximately average width (4½ inches); at the present time, such lines have a minimum width of 4 inches and a maximum width of 5 inches. If the viewer will imagine the housing 30 in FIG. 4 moving longitudinally (orthogonally of the line 14) this is approximately the relationship that will occur with a slowly drifting vehicle since the common horizontal axis of the row of six photocells and the longitudinal axis of the line 14 will remain in essentially perpendicular relationship. Assuming such motion, a position will be reached where the window is spanned by the reflected rays, i.e., light rays reflected from line 14 will impinge upon both photocells 62 and 76. If the width of line 14 is within the prescribed range, the output of AND gate 124 (FIG. 6) will go to the high logic level and activate the alarm 136.

However, the next outer pair of photocells 60 and 78 establishes a second response window that will be spanned by the received rays reflected from a roadway marking if such marking has a width greater than the maximum valid width. It will be appreciated that as the detector unit passes over the invalid marking a position could be reached (such as in FIG. 4) when both of the inner photocells 62 and 76 are excited, but the increased width would cause either or both of the photocells 60 and 78 to also be excited. Furthermore, an even greater width would excite one or both of the outboard pair of photocells 58 and 80, which are included to provide the photoresponsive receiver with additional resolution.

By way of an example, referring to FIG. 1, when the right unit 22 (hidden from view) passes over the radar marking stripe 16, all six photocells will be excited. As another example, a broken transverse stripe could cause excitation of both of the inner photocells 62 and 76 together with one of the outboard photocells 58 or 80.

Referring to FIG. 6, it may be appreciated that excitation of any photocell other than both of photocells 62 and 76 will preclude the generation of an activating signal by the AND gate 124. This is because the outputs of the circuits 112 and 114 controlled by photocells 62 and 76 are applied to the AND gate 120, whereas the remaining photocells are connected by their associated amplifier circuits to NOR gates 96 or 122. A high logic level at any NOR gate input will cause the output to go from the high to the low logic level and thereby close AND gate 124 even though the output of AND gate 120 is high. Therefore, high logic levels on all the inputs of AND gate 124 will only occur when the inner photocells 62 and 76 are exclusively excited, and the vehicle operator is neither operating the turn signals nor traveling at a speed less than 25 miles per hour (or such other minimum speed as may be selected). The turn signal disabling feature prevents the annoyance of an alarm when an alert driver is purposely changing lanes. The low speed disable prevents energization of the alarm at low residential speeds where it is assumed that the driver is sufficiently alert.

Once the alarm 136 has sounded and the alerted driver has the vehicle under control, the alarm is silenced by momentarily depressing the button of the reset switch 138. When relay coil 130 was energized to close its upper contacts 132 and activate the alarm 136, its lower contacts likewise closed and established a latching circuit to ground in parallel with the transistor switch 128 so that the alarm would remain on. Momentarily breaking the latching circuit by operating the reset switch 138 drops out the relay and turns off the alarm until another danger condition is sensed.

In order to provide a sufficiently constant background as seen by the photoresponsive receiver of the present invention, the lamps 48 are of the tungsten filament type in order to provide a light source that is rich in infrared and red radiation. The photocells are selected to have a response spectrum emphasizing the red and infrared wave lengths so as to provide significantly greater response to infrared and red radiation than to radiation of shorter wave length. Furthermore, the filters 64 and 82 provided by the red lenses pass red and infrared radiation and attenuate the shorter wavelengths to further increase the selectivity of the receiver. Accordingly, the road surface can change from dark asphalt to smooth concrete pavement without causing inadvertent triggering of the photocells.

In particular, the photocells 58–62 and 76–80 provide very high sensitivity to received radiation in the red and near infrared region (wavelengths of approximately 7000 to 8000 Angstroms). Bulk effect photoconductors such as the CL 503 and CL 703L, manufactured by Clairex Electronics, a Division of Clairex Corporation, Mount Vernon, New York, U.S.A., are suitable and employ a cadmium selenide material having significantly enhanced response in this range and a peak spectral response at 7350 Angstroms. At shorter wavelengths from yellow through ultraviolet (approximately 6000 Angstroms and shorter) the response of the cell is about 5 percent of its sensitivity at the 7350 Angstrom peak, resulting in high discrimination between near infrared and the shorter wavelengths of the visible spectrum and ultraviolet light.

It should also be appreciated that the system is inherently capable of differentiating between slow drifting of the vehicle and sudden veering such as an avoidance maneuver. This is because the latter maneuver causes the vehicle to cross the center line 12 at an increased angle as compared with slow drifting, thereby causing the receiver of the left detector unit 18 to sense an apparent width of the line 12 that is greater than its actual width. Accordingly, a sufficiently sharp crossing angle will cause the light reflected from an otherwise valid center line to fill the second response window defined by the photocells 60 and 78 thereby preventing activation of the alarm.

Having thus described the invention, what is claimed as new and desired to be secured by Letters Patent is:

1. Apparatus for warning the driver of a motor vehicle when the vehicle is about to drift across a line on a road surface having a width within a predetermined range of minimum and maximum widths indicative of a center line or an edge line, said apparatus comprising:
   a light source adapted to be carried by said vehicle adjacent a side thereof for directing light rays downwardly toward the road surface,
   a photoresponsive receiver adapted to be carried by said vehicle for receiving said light rays reflected from said surface,
   said receiver having photoelectric means for producing an output corresponding to reflected rays received at a plurality of points spaced horizontally transversely of the fore-and-aft axis of the vehicle, and means responsive to said output for producing an alarm-activating signal when said output is indicative of the reflection of said received rays from a line on said surface of at least said minimum width but no greater than said maximum width, and alarm means responsive to said activating signal for warning the driver, whereby to alert the driver to the detection of a center or edge line and discriminate against other markings of greater or lesser width.

2. Apparatus as claimed in claim 1, wherein said light source includes means for emitting substantial infrared radiation, and wherein said photoelectric means is responsive to said infrared radiation.

3. The apparatus as claimed in claim 1, wherein said light source has means for emitting substantial radiation in the red and near infrared region, and wherein said photoelectric means is characterized by greater response to radiation in said region than to radiation of lesser wave length.

4. The apparatus as claimed in claim 3, wherein said radiation emitting means includes an incandescent lamp having a tungsten filament, whereby the light rays emitted by said source are rich in radiation in said region.

5. The apparatus as claimed in claim 3, wherein said photoelectric means includes a plurality of photocells defining respective points.

6. The apparatus as claimed in claim 5, wherein each of said photocells is a photoconductive cadmium selenide cell characterized by substantially greater response to radiation having a wavelength of approximately 7000 to 8000 Angstroms, than to radiation of other wave lengths.

7. The apparatus as claimed in claim 3, wherein said photoelectric means includes filter means for attenuating received radiation shorter in wave length than red.

8. The apparatus as claimed in claim 1, wherein said photoelectric means includes a plurality of photoelectric devices, and said receiver includes structure supporting said devices in respective positions to define said plurality of transversely spaced points.

9. The apparatus as claimed in claim 8, wherein said photoelectric devices are at least four in number and comprise an inner pair and an outer pair thereof, and said structure mounts said inner pair a first distance apart which establishes a first response window that can be spanned by said received rays reflected from a marking on said surface of at least said minimum width, and mounts said outer pair a second, greater transverse distance apart which establishes a second response window that can be spanned by said received rays reflected from a marking on said surface of greater width than said maximum width, and wherein said activating signal producing means produces said alarm-activating signal only when said received rays are detected exclusively by both of the devices of said inner pair.

10. The apparatus as claimed in claim 9, wherein said light source is disposed between said inner pair of devices.

11. The apparatus as claimed in claim 9, wherein said photoelectric devices are six in number, and said structure mounts an additional pair thereof apart a third, still greater transverse distance, whereby to increase the resolution of the receiver.

12. The apparatus as claimed in claim 1, further comprising means coupled with said activating signal producing means and responsive to the speed of the vehicle for disabling the activating signal producing means when the speed of the vehicle is less than a predetermined minimum speed, whereby to prevent activation of the alarm unless the vehicle is traveling in excess of said minimum speed.

13. The apparatus as claimed in claim 1, further comprising a second light source and a second photoresponsive receiver adapted to be carried by said vehicle adjacent a side thereof opposite the first-mentioned side, said alarm means being connected with both of said receivers and responsive to the activating signal from either receiver.

14. The apparatus as claimed in claim 1, wherein said activating signal producing means includes logic circuitry having a gate for delivering said activating signal, and wherein said apparatus further comprises means responsive to operation of the turn signals of the vehicle for closing said gate to prevent the production of said activating signal, whereby the apparatus is effectively disabled when the driver operates the turn signals.

15. Apparatus for warning the driver of a motor vehicle when the vehicle is about to drift across a line on a road surface having a width within a predetermined range of minimum and maximum widths indicative of a center line or an edge line, said apparatus comprising:

a light source, photoresponsive means having first and second pairs of photoelectric devices, means for mounting said source on said vehicle adjacent a side thereof with said source disposed to direct light rays downwardly toward the road surface, and for mounting said photoresponsive means on said vehicle adjacent said source, said photoresponsive means including structure supporting said devices in respective positions for receiving said light rays reflected from said surface and detecting the same, said structure spacing said first pair of devices apart horizontally transversely of the fore-and-aft axis of the vehicle a first distance which establishes a first response window that can be spanned by said received rays reflected from a marking on said surface of at least said minimum width, and spacing said second pair of devices apart a second, greater transverse distance which establishes a second response window that can be spanned by said received rays reflected from a marking on said surface of greater width than said maximum width, alarm means for warning the driver, and control means connected with said devices and said alarm means for activating the latter when said received rays are detected by said first pair of devices but not by either of said devices of said second pair thereof, whereby to alert the driver to the detection of a center or edge line and discriminate against other markings of greater width.

* * * * *